United States Patent
Benton

(10) Patent No.: US 6,787,150 B2
(45) Date of Patent: Sep. 7, 2004

(54) SEED COATING FOR BYPASSING THE RUMINANT DIGESTIVE TRACT

(75) Inventor: Alfred E. Benton, Laguna Beach, CA (US)

(73) Assignee: KES Associates, Laguna Beach, CA (US)

(*) Notice: Subject to any disclaimer, the term of this patent is extended or adjusted under 35 U.S.C. 154(b) by 0 days.

(21) Appl. No.: 10/200,693

(22) Filed: Jul. 22, 2002

(65) Prior Publication Data

US 2004/0013751 A1 Jan. 22, 2004

(51) Int. Cl.[7] ................................................ A23K 1/100
(52) U.S. Cl. ...................... 424/438; 424/93.4; 424/496; 424/498; 424/750; 424/757; 435/179; 47/57.6
(58) Field of Search ................................ 424/438, 442, 424/78.01, 78.08, 490–491, 496, 498–502, 93.4, 750, 757, 428, 439, 93.1; 426/53; 111/104; 47/1.01 R, 57.6; 71/67, 64, 87; 435/179, 252.1, 252.2

(56) References Cited

U.S. PATENT DOCUMENTS

| | | |
|---|---|---|
| 3,959,493 A | 5/1976 | Baalsrud et al. |
| 3,961,081 A | 6/1976 | McKenzie |
| 4,642,317 A | 2/1987 | Palmquist et al. |
| 4,749,578 A | 6/1988 | Benton et al. |
| 4,808,412 A | 2/1989 | Smith et al. |
| 4,931,079 A | 6/1990 | Young |
| 5,183,759 A | 2/1993 | Triplett |
| RE35,162 E | 2/1996 | Draguesku et al. |
| 5,496,572 A * | 3/1996 | Rudden ...................... 426/74 |
| 5,586,411 A | 12/1996 | Gleddie et al. |
| 5,622,739 A | 4/1997 | Benton et al. |
| 5,662,958 A | 9/1997 | Kennelly et al. |
| 5,807,594 A | 9/1998 | King et al. |
| 5,928,687 A | 7/1999 | Meade et al. |
| 5,972,414 A * | 10/1999 | Harris ........................ 426/630 |
| 6,229,031 B1 | 5/2001 | Strohmaier et al. |
| 6,350,718 B1 | 2/2002 | Frisch |
| 6,440,478 B1 | 8/2002 | Benton et al. |

OTHER PUBLICATIONS

Morrison Feeds & Feeding p 176, 177, 268, 269 278–283, 1954.*

Holland, et al., "Range–Legume Inoculation and Nitrogen Fixation by Root–Nodule Bacteria"; California Agricultural Experiment Station Bulletin 842; 1969.

* cited by examiner

*Primary Examiner*—Neil S. Levy
(74) *Attorney, Agent, or Firm*—Christie, Parker & Hale, LLP

(57) ABSTRACT

Pasture grass and legume seeds are protected with an outer coating of insoluble fatty acid salts. The coated seeds are fed to ruminants and bypass their digestive tract. When the coated seeds exit the digestive tract in the manure, they provide ranchers a no-till broadcast technique to easily reseed or improve pasture forage. Legume seeds are preferably coated twice, first with Rhizobia and then with the insoluble fatty acid salts. The Rhizobia coating will improve the legume rate of growth. Alternatively, discreet particles of Rhizobia can be coated with insoluble fatty acid salts and fed to the ruminants along with coated legume seeds.

24 Claims, 1 Drawing Sheet

SEED COATING FOR BYPASSING THE RUMINANT DIGESTIVE TRACT

FIELD OF THE INVENTION

The invention is directed to a coated seed for bypassing the entire ruminant digestive tract, a method for coating such seeds, and a method for sowing bypassed seeds on a plot of grazing land.

DESCRIPTION OF THE PRIOR ART

Cattle, sheep, and other agriculturally important livestock are ruminants or cranial fermentors. These animals all have a rumen, which is a large, multicompartmented section of the digestive tract between the esophagus and the true stomach. The rumen contains a very complex ecosystem made up of cellulolytic microbes that, unlike multicellular organisms, are capable of digesting the cellulose that makes up a large part of a ruminant's diet.

The microbes in the rumen are essential for the digestion, through fermentation, of the large amounts of fibrous feeds that ruminants consume, but cannot otherwise efficiently utilize. Ruminants are able to utilize the end products of microbial fermentation and biosynthesis to meet their own nutritional needs.

However, having a rumen can adversely affect the nutritional physiology of these animals. Passage through the rumen can chemically change nutrients or medicaments that are fed to a ruminant. For instance, ruminants cannot directly utilize simple sugar sources of nutrition. Instead, simple sugars are fermented in the rumen to volatile fatty acids, which are then used by the ruminant. Also, essential amino acids are deaminized to ammonia and microbial proteins.

Nutrients and medicaments may have deleterious effects on the ecosystem of the rumen. For example, feeding fatty acids at above a 3% level to a ruminant can reduce the microbial growth rate of the cellulolytic microflora in the rumen. Furthermore, antibiotics can also depress growth of cellulolytic microbes in the rumen.

Nutritional restrictions associated with the rumen have prompted much work in the field of rumen-bypass products. Typical rumen-bypass products are protected from digestion in the rumen but are digested and absorbed in the lower portions of the ruminant digestive tract.

U.S. Pat. No. 4,642,317 to Palmquist, et al. discloses a process and composition for supplying fatty acids as nutrients to ruminants by feeding calcium salts of the fatty acids. These calcium salts bypass the rumen and are absorbed in the acidic environment of the abomasum and the small intestine.

U.S. Pat. No. 6,229,031 to Strohmaier, et al. disclose rumen bypass feed supplements, which are calcium salts of fatty acids and fatty acid glycerides. The supplements disclosed by Strohmaier, et al. bypass the rumen and are absorbed lower in the ruminant digestive tract.

Other patents disclose substances for protecting nutrients and other biologically active substances. Such protected nutrients and substances bypass the rumen and are released lower in the digestive tract of the ruminant.

U.S. Pat. No. 3,959,493 to Baalsrud, et al. disclose a fatty acid coating that protects biologically active substances during passage through the rumen but releases the active substance in the lower portions of the digestive tract.

U.S. Pat. No. Re. 35,162 to Draguesku, et al. discloses a stomach chamber bypass nutrient comprising a beadlet with two regions, a nutrient region and a region including fats and calcium based compounds. The beadlets disclosed by Draguesku, et al. bypass all four stomachs of the ruminant, but are digested in the remainder of the digestive system.

U.S. Pat. No. 5,928,687 to Meade, et al. disclose a rumen bypass feed supplement containing at least one biologically active material susceptible to inactivation in the rumen and a protective substance that is a glyceride-free mixture of aliphatic fatty acids, impervious to conditions in the rumen but which allow absorption of the biologically active material in the abomasum and the lower gut.

Overgrazing of pastures by livestock is both an ecological and an agricultural concern. The introduction of legumes into native pastures not only improves the quality of the feed, but the remaining legume forage and root nodules increase the nitrogen content and fertility of the over grazed soil. Furthermore, the increased quality of forage will increase livestock performance and the nitrogen percentage in the manure, which will also add nitrogen to the soil. With proper supplementation and introduction of more legumes into the pasture, the rancher will not only improve beef production, but also soil fertility.

Legumes fix nitrogen, making it biologically available, through a symbiotic relationship with Rhizobium bacteria. Each specific legume has a specific species of Rhizobia with which it is optimally symbiotic. Among the species of Rhizobia that form symbiotic relationships with various legumes are *Rhizobium trifolli, Rhizobium meliloti, Rhizobium leguminosarum, Rhizobium japonicum,* and the recombinant Rhizobia described in U.S. Pat. No. 5,183,759 to Triplett. Without the correct species of symbiotic Rhizobium, a legume will not flourish.

On the other hand, if both a legume and a symbiotic Rhizobium are present in the soil, the Rhizobium will penetrate the root hairs of the legume. Then the Rhizobium will form an infection thread, which allows the Rhizobium to travel into the legume's root cortex. Specialized plant cells then encase the Rhizobium, which proliferate, change morphology, and begin to fix nitrogen. These collections of specialized plants cells and Rhizobium form the root nodules, which are indicative of healthy legumes.

The benefit of the symbiotic relationship between legumes and Rhizobia has prompted research into this relationship. U.S. Pat. No. 5,586,411 to Gleddie, et al. discloses a method for treating seeds with a phosphate-solubilizing soil fungus and a Rhizobium prior to planting to increase the efficiency of modulation, nitrogen fixation, and legume crop production.

U.S. Pat. No. 6,350,718 to Frisch discloses organic solvents that may be used in seed treatment formulations to increase the viability of seeds in the field by translocating seed treating substances into the seed.

Methods of seeding legumes into established grasses include complete tillage, partial tillage, strip tillage interseeding, and surface broadcast seeding into undisturbed sod. Late winter frost-seeding into undisturbed sod has many potential advantages including renovation without herbicides, reduced labor requirements and energy inputs, shortening of the non-grazing period and a reduction of erosion on sloping sites. No-till planting is generally known in the prior art and can include any process that doesn't till the soil itself, such as chopping undesirable forage, mowing, and weed control spraying. Typically, no-till planting still requires machinery such as specialized seeders, broadcasters, and drills along with the labor to operate the machinery.

SUMMARY OF THE INVENTION

The present invention provides a coated seed that will bypass the entire ruminant digestive tract. This seed is coated with one or more insoluble fatty acid salts to protect it from degradation by conditions in the ruminant digestive tract. During its passage through the digestive system of the ruminant, the mechanical agitation and chemical digestion will open up fissures in the seed coating and allow the seed to germinate once it exits the digestive tract. Therefore, while the coating for the seed is sufficiently durable to pass through the digestive tract without being digested, the coating is not so durable to prevent the seed from germinating.

The coating is produced by first dissolving one or more insoluble fatty acid salts in a non-aqueous solvent. Then the seeds are coated with the mixture of solvent and insoluble fatty acid salts. Once the solvent evaporates, a homogeneous coating of insoluble fatty acid salts remains around the seed. While any type of seed may be coated in such a manner, legume seeds are particularly useful for improving the quality of pasture forage and the nitrogen content of soil.

The coated seed can also contain a supplement of Rhizobia, which is especially useful for legumes. Legume seeds coated with the corresponding symbiotic Rhizobia are commercially available. In the alternative, an uncoated seed can be directly coated with a suspension of Rhizobia. Such Rhizobia coated seeds are further coated with insoluble fatty acid salts as described above to protect both the seed and the Rhizobia from degradation in the ruminant digestive tract.

Feeding a legume seed coated with the corresponding symbiotic Rhizobia and protected by another coating of insoluble fatty acid salts to ruminants will result in efficient dispersion of the seeds when they pass out of the digestive tract of the ruminants. Furthermore, supplementing the legume seed with Rhizobia will increase the efficiency of nodulation, nitrogen fixation, and legume crop production.

BRIEF DESCRIPTION OF THE DRAWINGS

The invention will be more specifically described in connection with the accompanying drawing in which.

DETAILED DESCRIPTION OF THE INVENTION

To prepare the seed coating of the present invention, one or more insoluble fatty acid salts are first prepared from commercially available acidulated soapstock. Preferably, the soapstock is from soybean or cottonseed oil. More preferably, the soapstock comprises ten to twenty carbon fatty acids.

The soapstock is mixed with a source of divalent metal ions, such as hydrated lime (calcium oxide, CaO), and heated under agitation. In a preferred embodiment, the soapstock is mixed with about 13% by weight of hydrated lime, and slowly heated to a temperature of about 200° F. for about 30 minutes under constant agitation.

The mixture is heated until the foaming action subsides, signaling that the hydrated lime has neutralized most of the fatty acids. By that time, the mixture should thicken to a brown gravy-like consistency. Then the mixture is heated to a higher temperature. In a preferred embodiment, the mixture is heated to about 400–420° F. for about, 20–30 minutes under agitation until it has the consistency of taffy.

The mixture is then allowed to cool to form a friable crystal. This crystal is then ground to a powder.

In one embodiment, the insoluble fatty acid salts powder is dissolved into a non-aqueous solvent. Suitable solvents include hydrocarbon solvents and heteroatom-substituted hydrocarbon solvents, such as Exxsol D 80, produced by ExxonMobil Chemical. Preferably, the concentration of insoluble fatty acid salts in the mixture is about 15–23% by weight. A concentrated solution of insoluble fatty acid salts in the non-aqueous solvent is more viscous and will result in a thicker coating than a diluted and less viscous solution. If a less viscous mixture is desired, an emulsifying agent can be used to suspend the mixture in water. When using an emulsifying agent to suspend the mixture in water, the original solvent and insoluble fatty acid salts powder mixture should be allowed to stand for about 24 to 48 hours so that the powder may completely dissolve before adding the emulsifier and water. Emulsifying the non-aqueous solution can provide a greater range of solution viscosity and coating thickness.

Figure 1:
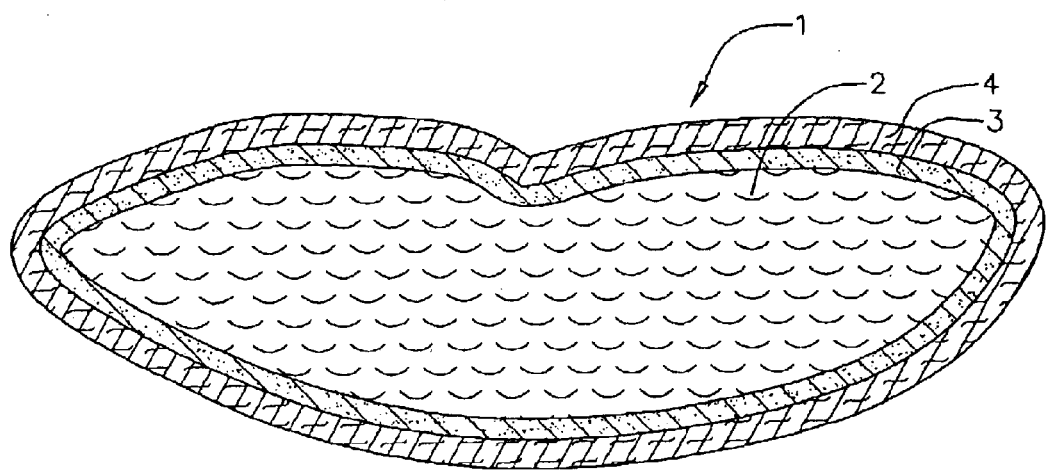
FIG. 1 is a cross-sectional view of a coated seed illustrating one embodiment of the invention.

The seeds are then coated with the mixture of solvent and insoluble fatty acid salts. A rotary batch seed treater, such as a Hege Treater, available from Hege Equipment, Inc. of Colwich, Kans., will suitably coat the seeds. In this type of treatment, a circular bowl containing the seeds is rotated around its central axis. Preferably, the bowl is rotated at high rpms. Then the mixture of solvent and insoluble fatty acid salts is slowly added to the bowl from the top of the central axis. The amount of the solvent mixture sufficient to coat the seed ranges from about 8 to 16 oz/cw of seed, depending on the type of seed treated. After the non-aqueous solvent evaporates, the treated seeds are ready to be used. Alternatively, seeds treated in such a manner will also have a commercially viable shelf life. As shown in FIG. 1, the coated seed 1 of this embodiment, contains a seed 2 and a smooth homogeneous shell of at least one insoluble fatty acid salts 4.

Figure 2:
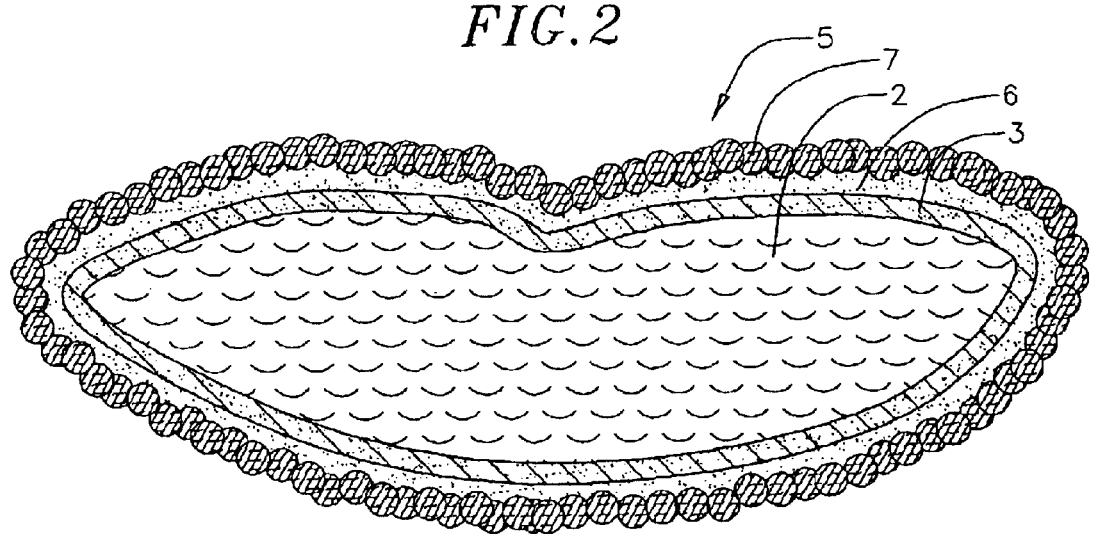
FIG. 2 is a cross-sectional view of a coated seed illustrating another embodiment of the invention.

In another embodiment, shown in FIG. 2, the seed 2 is coated with an adhesive 6 and then with the powdered insoluble fatty acid salts 7. A suitable adhesive is gum arabic. The viscosity of the gum arabic can be adjusting by diluting it with water. A concentrated solution of gum arabic is more viscous and will result in a thicker coating than a diluted and less viscous solution. Seeds can be coated with the adhesive and the powdered insoluble fatty acid salts by mixing. A cement mixer can suitably mix the seeds and the coating ingredients. In this embodiment, first the seeds are added to the mixer, then the solution of gum arabic, and finally the powdered insoluble fatty acid salts. A seed coated in this manner 5 will have a powdery surface as shown in FIG. 2.

In yet another embodiment of the invention, as shown in FIG. 1, legume seeds 2 are pre-coated by mixing with a solution 3 of the corresponding symbiotic Rhizobia before they are coated with insoluble fatty acid salts 4 as described above. In this embodiment, the seeds are coated with more than the recommended amount of Rhizobia to account for attrition during processing. Preferably, the seeds are coated with at least three times the recommended amount of Rhizobia.

In yet another embodiment of the invention, as shown in FIG. 2, legume seeds 2 are pre-coated by mixing with a solution 3 of the corresponding symbiotic Rhizobia before they are coated with an adhesive 6 and a mixture of powdered insoluble fatty acid salts 7. Although the last two embodiments have coated seeds incorporating a layer of Rhizobia, a Rhizobia coating is not necessary to practice the invention.

While legume seeds may be coated with Rhizobia and then coated with the insoluble fatty acid salts, another embodiment of the invention also provides symbiotic Rhizobia to legumes by feeding particles of Rhizobia coated with insoluble fatty acid salts along with the coated seeds. These particles are formed by prilling, or rolling, a solution of the symbiotic Rhizobia with an adhesive to form small particles. A suitable adhesive is gum arabic. These particles are then coated with insoluble fatty acid salts as described above.

The coated particles are fed to the ruminants at more than the recommended levels of Rhizobia for the legume to assure good coverage. Preferably, higher than recommended levels of Rhizobia can be fed, even as high as five times the recommended levels when deemed necessary, in the form of coated particles, along with the coated seeds. If the legume seeds are sufficiently durable, they may be fed uncoated to the ruminates along with the coated particles. This level of Rhizobia will overwhelm the competing bacteria in the environment and lead to a high rate of nodulation. This embodiment has the additional advantage of better control of the type and amount of Rhizobia supplemented with the legume seed. Further, this embodiment may be used to provide other symbiotic microbes to other plants by feeding these microbes, such as mycorhiza, coated with insoluble fatty acid salts along with coated seeds.

For legumes, the homogenous coating of insoluble fatty acid salts should be about one to two thousandths of an inch thick. For other seeds, such as grass seeds, or for particles of Rhizobia, the homogenous coating should be about two to three thousandths of an inch thick. Most of the seeds coated in this way will be protected from conditions in the entire ruminant digestive tract. Many planting seeds are treated with very toxic substances, such as insecticides, rodenticides, and other toxins, which can harm animals that ingest them. Therefore, care should be taken to select seeds for this treatment that are free from such substances.

The coated seeds and the coated particles of Rhizobia can be fed directly to the ruminants by top dressing them on hay or combining them with any controlled feed or supplement. In a preferred embodiment, the seeds and particles are mixed into a feed supplement block. A feed supplement block is generally made from molasses or other nutrients and used to supplement an animal's diet and increase the animals productivity. Exemplary feed supplement blocks are disclosed in U.S. Pat. Nos. 4,749,578 and 5,622,739 and U.S. patent application Ser. No. 08/755,150, all to Benton el al. These patents and patent applications are hereby incorporated by reference. This delivery system has the added benefit of allowing the rancher to select areas for seeding with specific seeds at specific times. A rancher may need to supplement areas that are overgrazed, hillsides that are damaged by erosion, or areas where cultivation of legumes is difficult.

While some of the coated seeds may be digested, most of the seeds and coated particles will bypass the entire digestive tract and be dispersed onto the pasture. These seeds and particles will be dispersed in the manure, which will provide fertilizer for the seeds. Due to the mechanical and chemical agitation in the digestive tract, fissures will be opened in the coating allowing outside forces to begin to scarify the seeds. During the time the deposited seeds are sitting on the pasture, more of the covering will be degraded by the conditions on the pasture, including kicking by the animals and degradation by wind, water, and insects. Further degradation by these same conditions will scarify the seed and enlarge openings in the coating, which will allow for water penetration and germination. Then the Rhizobia, whether pre-coated on the seed or provided in particles proximal to the seeds, will form nodules on the legume roots. This provides a no-till planting technique. Further, this provides a method for reseeding lands damaged by fire and improving forage in public lands and private hunting reserves.

The advantages of this technique include easy introduction of more legumes, improved forage quality, increased soil fertility, higher nitrogen recycling by the animals, and biological nitrogen fixation, which replaces chemical fertilizers and the large amounts of energy used for their production. In addition, all of the above advantages are available at lower costs to the farmer.

What is claimed is:

1. A method for sowing seeds on a plot of grazing land comprising:
   feeding to a ruminant a seed coated with: a nitrogen fixing coating comprising a suspension of microbes capable of fixing nitrogen; and a protective substance that is substantially resistant to digestion in the digestive tract of the ruminant; and
   grazing the ruminant on the plot of land.

2. The method of claim 1 wherein the seed is a legume seed selected from the group consisting of clover seeds, alfalfa seeds, pea seeds, lucerne seeds, soybean seeds, and vetch seeds.

3. The method of claim 1 wherein the seed is a grass seed.

4. The method of claim 1 wherein the protective substance is an insoluble fatty acid salt.

5. The method of claim 1, wherein the ruminant is selected from the group consisting of cattle, sheep, buffalos, goats, camels, llamas, deer, antelope, elk, and bison.

6. The method of claim 1, wherein the microbes are Rhizobia selected from the group consisting of *Rhizobium trifolii, Rhizobium meliloti, Rhizobium leguminosarum, Rhizobium japonicum,* and recombinant Rhizobia.

7. The method of claim 1, wherein the microbes are Mycorhiza.

8. The method of claim 1, wherein the protective substance covers the nitrogen fixing coating.

9. The method of claim 1, wherein the protective substance is adhered to the seed with an adhesive.

10. The method of claim 9, wherein the adhesive is gum arabic.

11. A method for sowing seeds on a plot of grazing land comprising the steps of:
    selecting a plot of land;
    selecting at least one ruminant for grazing on the plot of land;
    selecting a type of seed;
    coating the seed with a nitrogen fixing coating comprising a suspension of microbes capable of fixing nitrogen
    coating the seed with a protective substance substantially resistant to digestion in the digestive tract of the at least one ruminant;
    feeding the ruminant the coated seed; and
    grazing the ruminant on the plot of land.

12. The method of claim 11 wherein the seed is a legume seed selected from the group consisting of clover seeds, alfalfa seeds, pea seeds, lucerne seeds, soybean seeds, and vetch seeds.

13. The method of claim 11 wherein the seed is a grass seed.

14. The method of claim 11 wherein the protective substance is an insoluble fatty acid salt.

15. The method of claim 11 wherein the seed is first coated with a suspension of microbes capable of fixing nitrogen, then coated with the protective substance.

16. The method of claim 11 wherein the at least one ruminant is selected from the group consisting of cattle, sheep, buffalos, goats, camels, llamas, deer, antelope, elk, and bison.

17. The method of claim 11 wherein the microbes are Rhizobia selected from the group consisting of *Rhizobium trifolii, Rhizobium meliloti, Rhizobium leguminosarum, Rhizobium japonicum,* and recombinant Rhizobia.

18. The method of claim 11 wherein the microbes are Mycorhiza.

19. The method of claim 11 wherein the protective coating is adhered to the seed with an adhesive.

20. The method of claim 19 wherein the adhesive is gum arabic.

21. The method of claim 19 wherein the protective coating is a powder of insoluble fatty acid salts.

22. The method of claim 21 wherein the microbes are Rhizobia selected from the group consisting of *Rhizobium trifolii, Rhizobium meliloti, Rhizobium leguminosarum, Rhizobium japonicum,* and recombinant Rhizobia.

23. The method of claim 21 wherein the microbes are Mycorhiza.

24. The method of claim 21 wherein the protective coating covers the nitrogen fixing coating.

* * * * *